Sept. 1, 1970 R. FERROT 3,526,300
METHOD AND APPARATUS FOR CONTROL OF HIGH SPEED ELEVATOR
Filed Aug. 6, 1968 8 Sheets-Sheet 1

INVENTOR
ROGER FERROT
BY: McGlew and Toren
ATTORNEYS

INVENTOR
ROGER FERROT

INVENTOR
ROGER FERROT

INVENTOR
ROGER FERROT

United States Patent Office 3,526,300
Patented Sept. 1, 1970

3,526,300
METHOD AND APPARATUS FOR CONTROL OF HIGH SPEED ELEVATOR
Roger Ferrot, Geneva, Switzerland, assignor to Inventio Aktiengesellschaft, Hergiswil, Nidwalden, Switzerland
Filed Aug. 6, 1968, Ser. No. 750,581
Claims priority, application Switzerland, Aug. 8, 1967, 11,182/67
Int. Cl. B66b 1/28
U.S. Cl. 187—29
14 Claims

ABSTRACT OF THE DISCLOSURE

A high speed elevator, operated along a shaft by a winch whose motor is controlled by a servoregulator, has a predetermined constant maximum speed and predetermined acceleration and deceleration characteristics. The servoregulator receives variable speed order signals from a control apparatus having various signal inputs including a continuous signal of the instantaneous position of the eleavtor cabin, a signal respective to the calling floor, a continuous signal of the instantaneous speed of the elevator cabin, a signal representing the direction of movement of the cabin, a signal from a call selector associated with a call memory, and signals respective to the cabin approaching the level of each floor. When the elevator is at a starting floor and receives a call from a calling floor spaced by one or more floors from the starting floor, the elevator is accelerated toward its maximum constant speed following an acceleration curve. At the same time, a deceleration curve for the next succeeding floor in the direction of elevator movement is plotted as a continuous signal. The two characteristic curves intersect at a point before the elevator reaches the next succeeding floor. If a call from the next succeeding floor is received before the elevator passes this intersection point, the elevator is decelerated along a respective deceleration characteristic which will bring it to a stop at the next succeeding floor, after which the elevator will again start to move toward the calling floor. If no call is received from the next succeeding floor before the elevator reaches the intersection point just mentioned, another acceleration characteristic is developed respective to the following succeeding floor, and the procedure is repeated. If no call is received before the elevator reaches the intersection point of the characteristics corresponding to the following succeeding floor, the elevator continues to accelerate until it reaches its maximum constant speed. As the elevator passes the floor immediately preceding the calling floor, a deceleration characteristic correlated to the calling floor is developed as a control signal and intersects the characteristic representing the maximum constant speed of the elevator at a point in advance of the calling floor such that the elevator will come to rest at the level of the calling floor.

BACKGROUND OF THE INVENTION

In the usual elevator, namely a low speed elevator, it is found that the constant speed has a value sufficiently low that it can be attained irrespective of the magnitude of movement of the elevator. The deceleration path then has a constant length, with the result that the start of the deceleration does not depend upon the destination floor. The start of the deceleration occurs in advance of the destination floor at a distance equal to the length of a deceleration path. The position of the deceleration starting point is thus immovable and can consequently be readily materialized, for example, by a marker or gauge in the elevator shaft.

The conditions are otherwise in the case of a "high speed" elevator. In the case of such an elevator, in effect, the operating speed has a value a great deal higher, of a nature such that there are certain paths of travel in the course of which the operating speed cannot be obtained. These are the paths of travel for which the sum of the acceleration paths and the deceleration paths, corresponding to the choosen operating speed, exceed the distance separating the departure floor from the destination floor.

It will thus be easily perceived that, for certain paths of travel of the elevator cabin, the point of starting of deceleration depends not only on the destination floor, but also on the instantaneous speed of the cabin, and thus indirectly on the departure floor. The position of the starting point of the deceleration consequently is not immovable, and it is not possible to materialize such a point by a fixed marker or gauge. Also, because of the multiplicity of initial points of departure associated with each destination floor, a high speed elevator must be controlled in accordance with a special procedure which takes into account, at least indirectly, the various floors from which the cabin may depart.

Known solutions of this problem consist in providing a plurality of discrete values of operating speeds, for example three, and to adapt, for each course of travel, in accordance with its length, one or the other of these values as a specific operating speed. This leads to attribute to a given range of paths of travel a given operating speed. Thus, when the travel takes place between two consecutive floors, there is adapted an operating speed having a very low value such that it can be certain that the cabin can obtain such operating speed before beginning its deceleration. If the distance of the calling floor is greater, an intermediate constant speed value is adapted. The highest constant speed value is utilized for travels over a very long distance. As can be seen, it is a matter of the known solutions eluding the true problem of high speed elevators, since each time the elevator is caused to function as a normal low speed elevator. Furthermore, one of the major disadvantages of known solutions resides in that they necessitate recourse to many sets of materialized marks, for each stage, the points of starting of deceleration corresponding to the various distance from which each floor can summon the elevator. Being given that the choice of setting of the operating speeds must be such that the values adapted be suited to the shortest path of the corresponding range, it is certain that all the longer paths of travel of the range will be effectuated under less favorable conditions, that is to say will take more time. The ideal would be, in effect, to attain an operating speed respective to each possible path of travel, which is impractical. Furthermore, these solutions do not permit the taking into account of calls which are "the latest possible," for these late calls can correspond to a path of travel not falling into the range which has been selected at the departure of the elevator.

SUMMARY OF THE INVENTION

This invention relates to the control of high speed elevators and, more particularly, to a novel and improved method of and apparatus for effecting such control.

One objective of the invention is a method or process for controlling a high speed elevator whose cabin, moved by a winch which is servoregulated as to speed, provides a signal representing the instantaneous speed of the cabin, as it is displaced along the elevator shaft, from a position providing a signal representing the instantaneous position of the cabin, and which has a movement defined by an acceleration characteristic determining the speed increase following the instant of departure, has a constant operating speed, and a deceleration characteristic determining, as a function of the path of travel, the decrease of speed to the destination point. This elevator is equipped with a techometer providing a signal representing the instantaneous speed of the cabin, and with a position detector providing a signal representing the instanteous position of its cabin.

In an elevator, all travel of the cabin comprises the three following successive phases:

(a) An acceleration phase, in the course of which the cabin, starting from the speed zero, attains, following a predetermined acceleration condition, an operating speed. The distance travelled during this phase is the acceleration path.

(b) A phase of movement at the operating speed;

(c) A slackening phase or deceleration phase, in the course of which the cabin, departing from the operating speed, is brought to a standstill acocrding to a predetermined deceleration characteristic. The path travelled during this phase is the path of slackening or path of deceleration.

The method which forms an objective of the invention eliminates the inconveniences of known methods and procedures, as mentioned above, and permits control of a high speed elevator in a manner to impose on the cabin an optimum speed. This optimum speed, all in respect to a slackening or deceleration characteristic determined invariably for a standard of comfort adopted once for all, imposes without regard to the path, whether long or short, ascending or descending, a minimum duration while assuring a great precision of stoppping. Moreover, it permits the eelvator to honor calls which arrive at the last possible moment before the elevator reaches the respective floor.

In accordance with the method, there is generated a floor signal representing the absolute position of the floor nearest to which the cabin can be stopped, taking into account the predetermined characteristic of deceleration. This signal is continually transformed into a cabin relative position signal equal to the absolute value of the difference between the position signal and the floor signal. There is also derived, from said relative position signal and in conformance with the deceleration characteristic, a slackening signal representing, at each instant, the maximum value of the speed which the cabin cannot exceed if it is able to be stopped at the nearest floor.

In further accordance with the invention method, the instantaneous speed signal is continuously compared with the slackening signal. Also, if, at the moment when these two signals are equal, there is present a call from the nearest floor, the slackening signal is used as an order signal for the regulator during the following movement and, if at the moment when the instantaneous speed signal and the slackening signal are equal, there is not present a call for the nearest floor, there is generated a floor signal corresponding to the following floor. These operations are repeated by taking each successive floor as the new nearest floor.

The apparatus for performing the method of the invention in controlling a high speed elevator comprises a controlled motor driven winch, which is controlled by a speed regulator which latter is controlled by a speed programmer. The apparatus includes a cabin which the winch can move in an elevator shaft, the elevator being equipped with a call memory, with a floor selector operable to provide a floor signal representing the side of the next floor which the cabin can service, with a call detector providing a call signal when there is conicidence between the number of the calling floor and the number of the nearest floor which can be serviced, with a position detector delivering a signal representing the absolute position of the cabin in the elevator shaft, and with a tachometer delivering a signal representing the instantaneous speed of the cabin. The movement of the cabin comprises an acceleration phase, during which the speed is increased in accordance with a given acceleration characteristic, an operating phase during which the speed is constant, and a deceleration phase during which the speed decreases as a function of the distance to be travelled and in accordance with a given deceleration characteristic.

The apparatus includes a subtractor having one input connected to the position detector and another input connected to the floor selector, this substractor providing an output signal which, being equal to the absolute value of the difference between the absolute position signal and the floor signal, represents the relative position of the cabin with respect to the floor corresponding to the signaling floor. The apparatus also includes a function generator connected to the output of the subtractor and providing a slackening or deceleration signal which varies as a function of the relative position signal in accordance with a characteristic identical with the mentioned deceleration characteristic. A comparator is provided and has two inputs, one connected to the output of the function generator and other connected to the tachometer. This comparator provides a control signal whenever the deceleration signal is equal to the signal.

The apparatus further includes a control circuit having two inputs, one connected to the comparator and the other to the floor selector. This control circuit operates so that a signal is developed, the action comprising, when the call signal corresponds to the absence in the call memory of a call for said floor, of delivering advance signals to advance or step the call selector by one position in a sense corresponding to the direction in which the elevator cabin is moving and, when the call signal corresponding to the presence in the call memory of a call for the floor, of delivering a signal for starting a deceleration to operate the programmer to substitute the deceleration signal for the order signal which it has been delivering.

The entire apparatus acts in a manner such that, in the first case, the cabin executes a movement in accordance with the program imposed by the programmer and, in the second case, the movement of the cabin relies on the deceleration characteristic in a manner such that the apparatus permits the elevator to honor all calls for a floor when such call or calls arrive before the instant of starting of the deceleration characteristic corresponding to such floor.

An object of the invention is to provide an improved method of controlling a high speed elevator.

Another object of the invention is to provide an improved control apparatus for a high speed elevator.

A further object of the invention is to provide such a method and apparatus which are greatly simplified and much more effective than known methods and apparatus of this type.

For an understanding of the principles of the invention, reference is made to the following description of typical embodiments thereof as illustrated in the accompanying drawings.

DETAILED DESCRIPTION OF THE PREFERRED EMBODIMENTS

Figure 1:
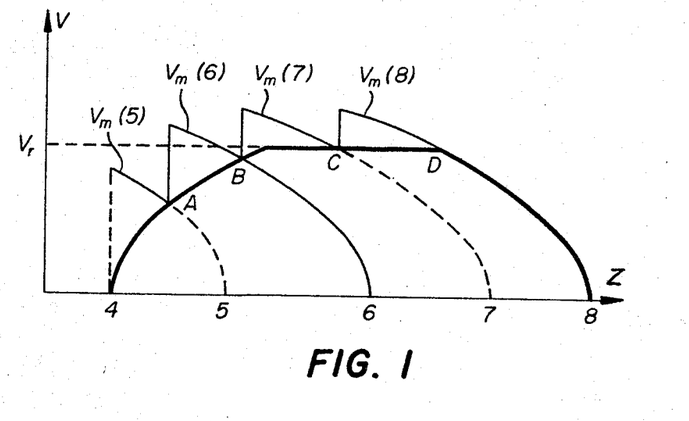
FIG. 1 is a graphic illustration of the movement of the elevator cabin.

The method is illustrated by FIG. 1, wherein there is represented the speed V of the cabin as a function of the path Z travelled by the cabin. The various floors are represented by their numbers 4, 5, 6, 7, 8 etc.

Assume that the cabin, stopped at floor 4, receives a call for floor 8. At the instant of starting, a pulse is sent to the floor selector and is of a nature such as to provide a signal corresponding to the following floor, that is, the floor 5. While the cabin accelerates in conformity to an absolute speed program or characteristic independent of whatever is the final phase, there is developed, with the aid of a function generator or functional decoder, a signal representing the deceleration speed $V_m(5)$, which is the maximum speed that the cabin cannot exceed if it must stop at floor 5. There is thus developed an "imaginary" deceleration speed even though, in fact, the cabin is called to the floor 8. This "imaginary" speed $V_m(5)$ decreases while the instantaneous speed effective on the cabin increases in accordance with the curve $V_A$ in accordance with the acceleration speed, so that the two speed curves become equal at a coincidence point A.

If, between the time of departure from floor 4 and the instant of coincidence at point A, no signal appears from floor 5, there is sent to the floor selector a new pulse at the moment when the point A is attained. This pulse has a nature such that the floor selector thereupon produces a signal corresponding to the floor 6. At the same instant, the functional decoder produces a signal representing the imaginary deceleration speed $V_m(6)$, while the effective or actual speed V continues to increase. A new coincidence is produced at the point B.

Assume that meanwhile a call for floor 6 appears. In this case, no impulse is sent to the floor selector at the time when point B is attained, so that the floor selector continues to produce a signal corresponding to floor 6. The deceleration stage for the floor 6 is thus locked in when point B, which marks the beginning of the deceleration, is reached, thus permitting the cabin to stop at floor 6. At this time, the speed V follows the curve $V_m(6)$ right to stopping of the cabin at floor 6.

Assume, on the contrary, that no call for floor 6 appears before clearing of the point B. In this case, a new pulse is sent to the floor selector at the moment when the cabin passes point B, this impulse being such that the call selector indicates thereafter floor 7 and the functional decoder produces the signal represented by curve $V_m(7)$.

In the particular example under discussion, the running speed is attained a little after passage of the point B. From thereon, the speed V remains constant and equal to the value $V_r$. But, as the characteristic $V_m(7)$ continues in a decreasing manner, a new coincidence point is produced at point C. If there is no call for floor 7, the call selector is advanced by a new step when the point C is attained, and now produces a signal corresponding to floor 8. The functional decoder, produces, from this time on, a signal represented by the curve $V_m(8)$, and the cabin continues its movement at a constant speed right up to the point D.

As, in the foregoing example, it has been assumed that there is a call for floor 8, the call selector continues to indicate this floor after the cabin clears the point of beginning of deceleration D, so that the deceleration phase is locked in. The speed of the cabin is then made to follow the curve $V_m(8)$ which is utilized as a speed order for the servoregulator of the winch. This speed diminishes in accordance with the curve $V_m(8)$ up to the point where the cabin stops at floor 8.

It may be stated, for example, that if a call for floor 6 appears after passage of the point B, this call cannot be taken into consideration until the time when the elevator cabin will have completed its travel and stopped at the floor 8. On the other hand, all calls for floor 6 which appear before the cabin has cleared point B, which marks the beginning of a deceleration for that floor, can be honored. Thus, the described method permits taking into consideration calls arriving "at the latest possible moment" for each floor.

Figure 2:
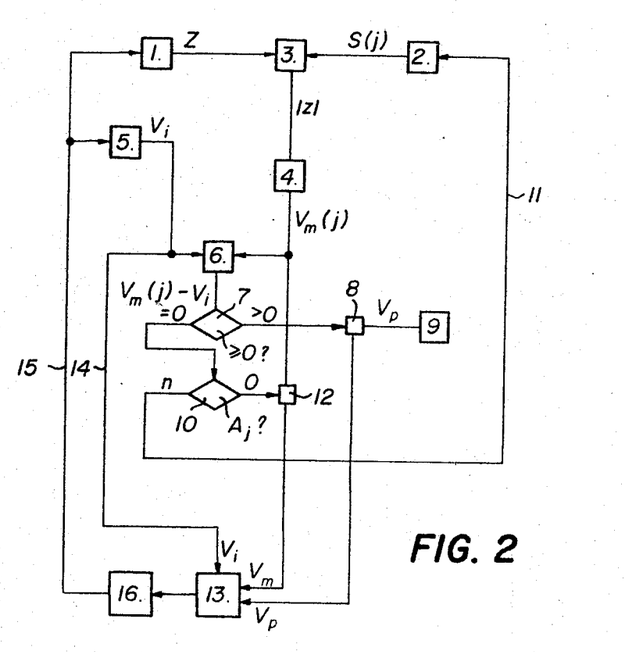
FIG. 2 is a schematic representation of the operations comprised in the control method of the invention.

This sequence of operations is represented by the schematic block circuit diagram of FIG. 2. Block 1 represents the production of a signal Z corresponding to the algebraic value of the instantaneous absolute position of the cabin in its shaft. Block 2 represents the production of the floor signal $S(j)$ corresponding to the algebraic value of the absolute position of the nearest floor at which the cabin can be stopped. The production of the absolute value of the difference between these signals is represented by the block 3. This difference corresponds to the absolute value $|z|$ of the instantaneous relative position z, measured by taking as origins the position $S(j)$ of the floor of the rank $j: |z| = (S(j) - Z)$. Besides the signal $|z|$, there is produced a maximum speed signal $V_m(j)$ for the floor at the level or rank j, and this is represented by the block 4. The production of the signal $V_i$, representing the instantaneous speed of the cabin, is represented by the block 5. The comparison between $V_m(j)$ and $V_i$ is represented by the block 6, and the determination of the sign of the difference between these two signals is represented by the rhomb or diamond 7.

Whenever the difference is positive (>0), the cabin is allowed to pursue its normal course, which is shown by the block 8 which then lets pass to the servoregulator the speed order $V_p$ produced in block 9 in accordance with the acceleration program, which is maintained constant until it is equal to the running speed $V_r$. When the sign of the difference $(V_m(j) - V_i)$ becomes null, an examination is made as to whether or not there is a call for floor j. This examination is represented by the rhomb or diamond 10. If there is no call (letter n), there is produced from this instant the signal $S(j+1)$ corresponding to the following stage at the level $j+1$. This mode of action constitutes a feedback which is represented by line 11.

If there is a call (letter o), the corresponding deceleration speed is taken as a speed order, as schematically indicated by the block 12 which then lets pass a signal $V_m(j)$ to the servoregulator 13, and the block 8 retains the signal $V_p$. Whether the movement of the cabin is controlled by the order $V_p$ (normal speed) or by the order $V_m(j)$ (deceleration to stop at stage j), is determined by the servoregulator 13 of the winch. The servoregulator thus compares the signal representing the instantaneous speed $V_i$ to the value of the order, which represents one or the other of the two speeds dependent upon whether the sign $V_m(j) - V_i$ is positive or null. This comparison is represented by the block 13, the path of the information relative to the speed $V_i$ being represented by the line 14, and the fact that the result, from the comparison of the movement of the cabin with a corresponding variation of its absolute position Z, will constitute a feedback, is shown by the line 15 leaving the block 16 which represents the winch.

Figure 3:
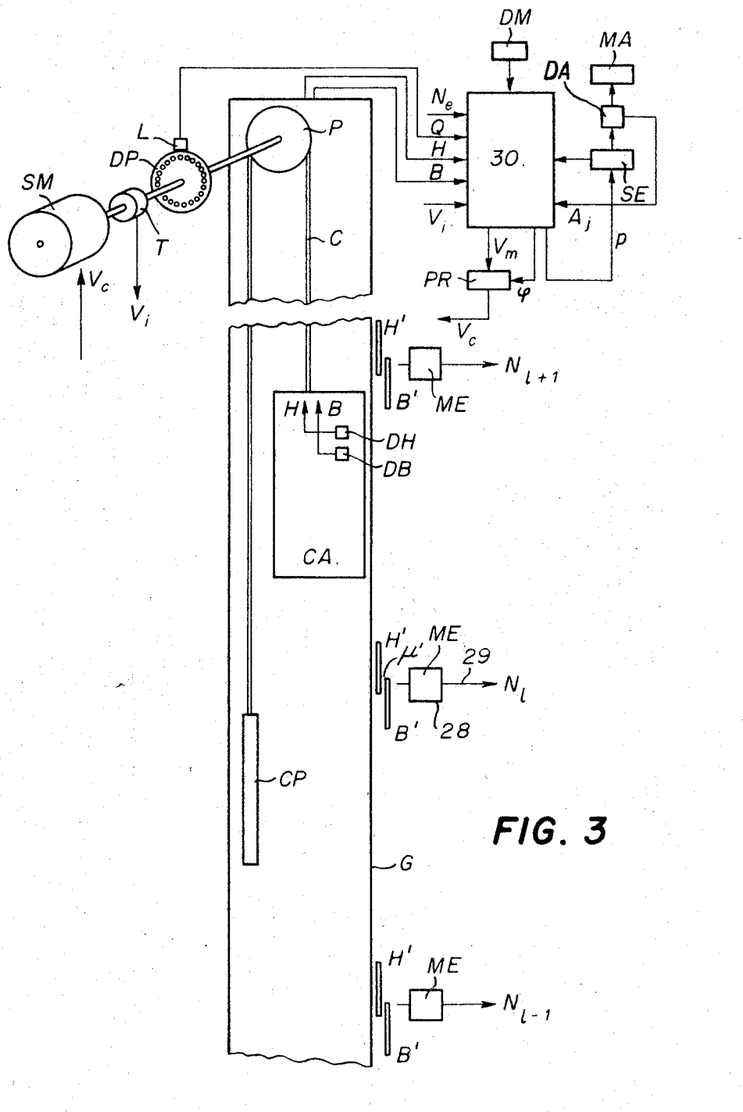
FIG. 3 is a schematic representation of the essential parts of the elevator and their association with the control apparatus.
Figure 4:
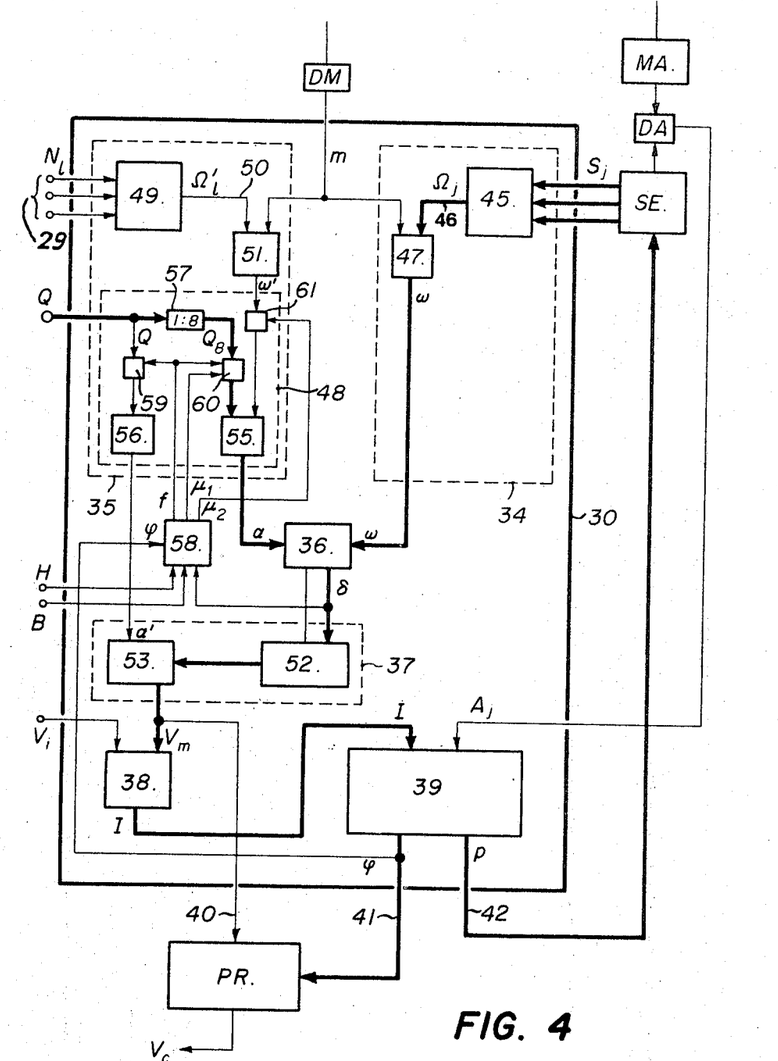
FIG. 4 is a schematic functional diagram of one form of a preferred embodiment of the control apparatus.

The apparatus for performing the control method of the invention will now be described. This apparatus is schematically represented in FIG. 4, while the assembly of the elevator whose movement is controlled by the apparatus is shown in FIG. 3. Referring to FIG. 3, the enclosure which defines the elevator shaft along which the cabin CA is moved is shown at G, and there is also shown the counterweight CP suspended from the cable C moved by the pulley or windlass P. This pulley itself is driven by a control motor SM whose speed is measured by a tachometer T which, being secured on the shaft of motor SM, produces a signal $V_1$ representing the instantaneous speed of the cabin. The motor shaft carries, on its outer end, a perforated disk DP cooperating with a reader or detector L (for example, a photoelectric detector) to produce impulses Q. The assembly of the perforated disk and the detector constitutes a position detector whose signals provide knowledge of the instantaneous position of the cabin CA.

Detectors ME, for example, contactors actuated by passage of cabin CA, are disposed along the shaft and constitute marks or indicators of the individual floors. Two of these are provided at a floor 1, and act to produce, at the moment when they are actuated, a signal $N_1$ corresponding to the number of the floor 1 at which the cabin is then positioned. This signal $N_1$ is directed toward the control apparatus 30 by an individual line, for example the line 29 for the detector 28. In addition, proximity detectors, designated by H' and B', respectively, are disposed at the right of each floor. These detectors, which are not individualized, act to indicate that the cabin CA is above (H') or, respectively, below (B') the mark of the corresponding floor. These proximity indicators can be, for example, in the form of ferromagnetic armatures which are disposed along the shaft G and which close a magnetic proximity detector circuit $D_H$ or, respectively, $D_B$, carried by the cabin CA. One of these circuits $D_H$ is excited by the armature H', and the other $D_B$ is excited by the armature B'.

These proximity indicators act in the manner such that a signal H is delivered by the detector $D_H$ when the cabin is in proximity above one of the floor markers ME, and a signal B is delivered by the detector $D_B$ when the cabin is in proximity below the same floor mark ME. When the cabin is exactly level with the corresponding floor, the signals H and B are simultaneously delivered as schematically represented by the overlapping $\mu'$ of the armatures H' and B'. For example, the armatures H' and B' can each measure 384 mm. in length, and overlap by 18 mm., so that the signal $\mu' = H \triangle B$, representing the simultaneous energization of elements H and B, is present in a zone $\mu'$ of $\pm 9$ mm. around a position corresponding to exact leveling at the floor.

The elevator is provided with a call memory MA, a floor selector SE, and a call detector DA. This last acts to deliver a signal $A_j$ whenever the call memory MA contains a call for a floor of the rank $j$ selected by the floor selector SE. Finally, a programmer PR provides the signal $V_c$ which represents the variable speed order controlling the motor SM. All these devices (controlled motor, tachometer, detector for the perforated disk, floor marks, call memory, floor selector, call detector and programmer) are well known and it will not be necessary to describe the same in detail inasmuch as they form no part of the invention.

Referring to FIG. 4, the control apparatus 30, which is an objective of the invention, comprises a first numerical coder 34 connected to the outputs of floor selector SE, a second numerical coder 35 connected to the output of the several floor detectors ME and to the output of the detector L of the perforated disk DP, a numerical subtractor 36 connected to the output of the two coders 34 and 35, and a function generator 37 connected to the output of subtractor 36. A comparator 38 is connected to the output of function generator 37 and a call controller 39 has inputs connected, on one hand, to the output of comparator 38 and, on the other hand, to the output of call detector DA. The outputs of the control apparatus 30 are three in number, the outputs 40 and 41, the first of which is connected to the output of function generator 37 and the second of which is constituted by one of the outputs of call controller 39, and the output 42 constituted by the other output of call controller 39. The two outputs 40 and 41 are connected to the inputs of programmer PR. The output 40 is connected to one of the two principal inputs of the programmer, while the output 41 is connected to the control input of the latter. With respect to the output 42, this is connected to the floor selector SE, and controls the advance of the latter.

The first coder 34 comprises a diode matrix 45 acting to provide, at its output 46, a series $\Omega_j$ of binary signals $\Omega_k$ representing, in the form of a numerical binary code, the position of the floor $S_j$ selected by the floor selector SE. This matrix 45 is followed by an inverter 47, whose nature and function will be described hereinafter. At the output of this inverter, there appears a series $\omega$ of binary signals $\omega_k$ representative of the absolute direction of the floor $S_j$.

The second coder 35 comprises a counting circuit 48, which receives the pulses Q delivered by the reader L of the perforated disk DP, and a diode matrix 49, identical to the matrix 45 of the first coder 34. The matrix 49 serves to deliver, at its output 50, a series $\Omega'_1$ of binary signals $\Omega'_k$ representing, in the form of a numerical binary code, the position of the floor $N_1$ before which cabin CA is passing. Matrix 49 is followed by an inverter 51, whose construction and function will be explained hereinafter and at whose output appears a series $\omega'$ of binary signals $\omega'_k$ representative of the absolute direction of the stage $N_1$.

With respect to the counting circuit 48, this acts to deliver a series $\alpha$ of binary signals $\alpha_k$ representative of the absolute direction attained by the cabin CA in proportion and as a measure of its movement under the effect of rotation of pulley P. This counting circuit comprises two counters, namely a first counter 55 called "principal" counter and a second counter 56 called "end of path" counter. Counter 55 receives pulses $Q_8$ resulting from the division, by 8, of the pulses Q provided by the reader or detector L, this division by 8 being assured by a vernier arrangement or reducer 57. The counter 56 receives the pulses Q directly and without preliminary division. It is not until the end of the path of travel that this latter counter comes into action, and it then is substituted for the principal counter 55. It is counter 55 which delivers the signals $\alpha$ directed to the subtractor 36, while the counter 56 delivers, when it is in action, a series $\alpha'$ of binary signals $\alpha'_k$ which, as will be shown hereinafter, are delivered directly to the function generator 37.

A circuit 58, acting to control the counters, controls an assembly of two electronic gates 59 and 60, which control, by passing or stopping, the arrival of pulses Q respectively, $Q_8$, at their respective counters, and a third electronic gate 61 which passes or blocks the arrival of the pulse series $\omega'$ to the principal counter 55. The counter control 58 receives, on the one hand, the series $\delta$ of binary signals $\delta_k$ issuing from subtractor 36 and, on the other hand, the signals H and B generated by the proximity detectors $D_H$ and $D_B$, respectively, carried by the cabin, and thus delivers a signal $\phi$ whose action will be described hereinafter.

The two inverters 47 and 51, which are connected to the output of matrices 45 and 49, respectively, receive a signal $m$ delivered from a direction sensor DM. This sensor delivers a signal $m=1$ when the cabin has an ascending movement, and a signal $m=0$ when the cabin has a descending movement.

Function generator 37 comprises a first hybrid numerical-analog decoder 52, called the "principal" decoder, acting to deliver a voltage $v$ as a function of the binary signal $\delta$ which is then arriving, in the same manner as the deceleration speed $V_m(j)$ is a function of the relative position $z$ of the cabin. That is to say, in accordance with the curve of FIG. 1 as mentioned above. This voltage $v$ constitutes, however, only an approximation of the curve $V_m(j)$ of FIG. 1. The variation of $v$ presents a course by the pulses $Q_8$. This voltage $v$ feeds a second hybrid numerical-analog decoder 53, called the "end of course" decoder and serving to deliver a voltage $V_m$ which, when $\alpha'=0$, is identical to voltage $v$, and which, when $\alpha'$ varies from 0, constitutes a finer approximation of the end of the curve $V_m(j)$ of FIG. 1. This is due to the fact that the approximation comprises a scale of the pulses Q which are now 8 times greater than the scale given approximately by voltage $v$. The greater precision of this approximation of the end of the path improves the precision of stopping of the cabin.

The function of this apparatus will be easily understood by reference to the heavy line circuits of FIG. 4. The floor selector SE, being set on the floor at the level $j$, delivers a corresponding signal $S_j$ which matrix 45 transforms into a binary signal $\Omega$. If cabin CA is ascending, which means that the direction sensor DM delivers a signal $m=1$ the inverter 47 transmits the signal $\Omega$ without change, that the signal $\omega=\Omega$ which arrives at subtractor 36 represents the absolute direction of the floor at the level $j$, coded under a binary form by the first coder 34.

Assume that the cabin CA is in movement. In proportion and as a measure of its movement, the impulses Q succeed each other, are divided by 8 and, the cabin being between two floors, and thus outside the zone of overlap $\mu'$ of the proximity marks or detectors H' and B', the gate 60 allows the impulses $Q_8$ to arrive at the principal counter 55. On the contrary, the gate 59 blocks impulses Q so that they cannot arrive at the end of course counter 56, which remains inoperable with its output $\alpha'$ being null. The binary signal $\alpha$ which arrives at the subtractor 36 is thus the only signal which is representative of the instantaneous absolute position of the cabin.

Subtractor 36 derives the difference between $\omega$ and $\alpha$ and delivers a binary signal $\delta$ representing, in the form of a binary code, the relative instantaneous position $z$ of the cabin, measured with respect to the floor at the level $j$ selected by the call selector SE. This signal $\delta$ is transformed by the principal decoder 52 of function generator 37 into a voltage $v$ which, because $\alpha'=0$, is delivered, without modification, at the output of the end of path decoder 53. The analog signal $V_m$ which appears at the output of function generator 37, arrives at the comparator 38 which also receives the signal $V_i$ delivered from tachometer T and representing the instantaneous speed of cabin CA. As soon as the signal $V_m$, which decreases in accordance with and as a measure of the progress of the cabin, becomes equal to $V_i$, the comparator 38 delivers a pulse I which is directed toward call controller 39. If call detector DA does not transmit any signal $A_j$ (which is to say that $A_j=0$), which corresponds to the absence, in call memory MA, of a call for the floor at the level $j$ under which the call selector is set, the call controller 39 delivers, when the signal I arrives thereat, a pulse $p=1$ always maintaining $\phi=0$.

Signal I advances floor selector SE from the position $j$ to the position $j+1$. This advance results in a rapid increase of the signal $\omega$, which passes from $\omega=\Omega_j$ to $\omega=\Omega_{j+1}$. In turn, this increases the signal $\delta$. It is then the same as the signal $V_m$ which constitutes the approximation of the deceleration characteristic $V_m(j+1)$ relative to the floor of the level $j+1$, and whose abrupt decrease results in the disappearance of the signal I. As the signal $\phi$ stays at null, cabin CA pursues its movement in conformity with the program imposed by the programmer PR. If, on the contrary, there is no call for floor $j$ (which means that $A_j=1$), call controller 39 maintains $p=0$ and delivers a pulse $\phi=1$ which arrives at the programmer PR. The programmer delivers at this time an order signal $V_c$ which is equal to $V_m$, so that the cabin is then controlled to move in accordance with the deceleration characteristic represented by the curve $V_m(j)$ relative to stopping at the floor at the level $j$.

As the cabin arrives in the proximity of the floor $j$, the signal $\delta$ approaches 0. This has the effect of preparing (how will be made apparent hereinafter) the control circuit 58 to come into action. At the moment when the cabin arrives at the level of the armature B', a detector $D_B$ delivers a signal $B=1$, which triggers the emission from circuit 58 of a signal $f$. This signal $f$ has the effect of unblocking gate 59 and blocking gate 60. It thus triggers the entry into action of the end of path counter 56, and puts out of action the principal counter 55 in the state which the latter has attained. Counter 55 being blocked, the signal $v$ now remains constant. However, counter 56 begins to deliver the signal $\alpha'$, increasing at the output of the end of path decoder 53, in place of providing the signal $V_m=v$, modifying the latter to give, in proportion and as a measure of the successive pulses Q, a variation which constitutes a finer approximation of the end of the deceleration path $V_m(j)$. The cabin CA continues to decelerate in accordance with a curve more precise and stops with precision at the level of floor $j$.

When the cabin is descending, the function would be, in principle, similar to that which has been described, under the condition that the counter could operate in the same manner in an inverse sense, which would require resort to a reversible counter. In addition, it will be necessary that the subtractor 36 be designed to provide a negative difference while, in descent of the cabin, the direction of the destination floor $S_j$ is always below the instantaneous absolute position Z of the cabin. To avoid the technological complications inherent in the use of a counter capable of counting in reverse directions, and of a subtractor capable of treating negative quantities, resort is had to an artifice.

This is based on the fact that if, in place of subtracting a quantity Z from another quantity $S_j$ which is less than the latter, there is substracted the complement $[(2^n-1)-Z]$ of the first from the complement $$[(2^n-1)-S_j]$$

of the second, to obtain the positive quantity $(Z-S_j)$, or stated another way, the absolute value of the negative quantity $(S_j-Z)$. For this purpose, the inverters 47 and 51 operate so that the signals $\omega$ and $\omega'$, respectively, which they deliver representing the directions $\Omega$ and $\Omega'$, respectively, of the floors, are the logical complements $\overline{\Omega}$ and $\overline{\Omega'}$, respectively, of the directions, in accordance with whether the cabin is ascending ($m=1$) or descending ($m=0$). In this manner, the counter 55 is a counter which has no sense of direction, and the subtractor 36 always delivers a positive signal which represents the absolute value of the instantaneous relative direction of the cabin.

Each time that the cabin is stopped or passes before the marks or detectors H' and B', and thus at each floor, the detectors $D_H$ and $D_B$ are placed in action. Whether the cabin is stopped in the corresponding overlap zone or whether it clears the latter, these detectors simultaneously deliver the signals $H=1$ and $B=1$, respectively. Control circuit 58 acts then to emit a signal $\mu_1$ which blocks gate 60, then, with a slight delay, a signal $\mu_2$ which unblocks gate 61. Consequently, at each stage the counter is isolated, over a short distance, from pulses $Q_8$, and it receives the signal representing the direction $\Omega'$, or its complement $\overline{\Omega'}$, in accordance with the signals $N_1$ of the floor marks before which the cabin is passing at that instant. This signal triggers then a resetting of the principal counter 55, and such resetting takes place each time that $\mu_2=1$, and thus each time that the cabin is stopped or passing before a floor of the level 1. This resetting is precise since the signal $N_1$ corresponding to the floor is transmitted only when the cabin is at the middle of the overlap zone $\mu'$ of the markers or detectors H' and B', the highest value of which overlap zone is only of the order of + or −9 mm. This resetting has the effect of correcting all errors which could result from the perforated disk PF with respect to cable C, from an elongation of the latter, or from any other reason. However, it has a still further effect. This is to set the counter, upon departure of the cabin, in the direction of the departure floor or the complement of this direction, in accordance with whether the cabin is ascending ($m=1$) or descending ($m=0$).

Figure 5:
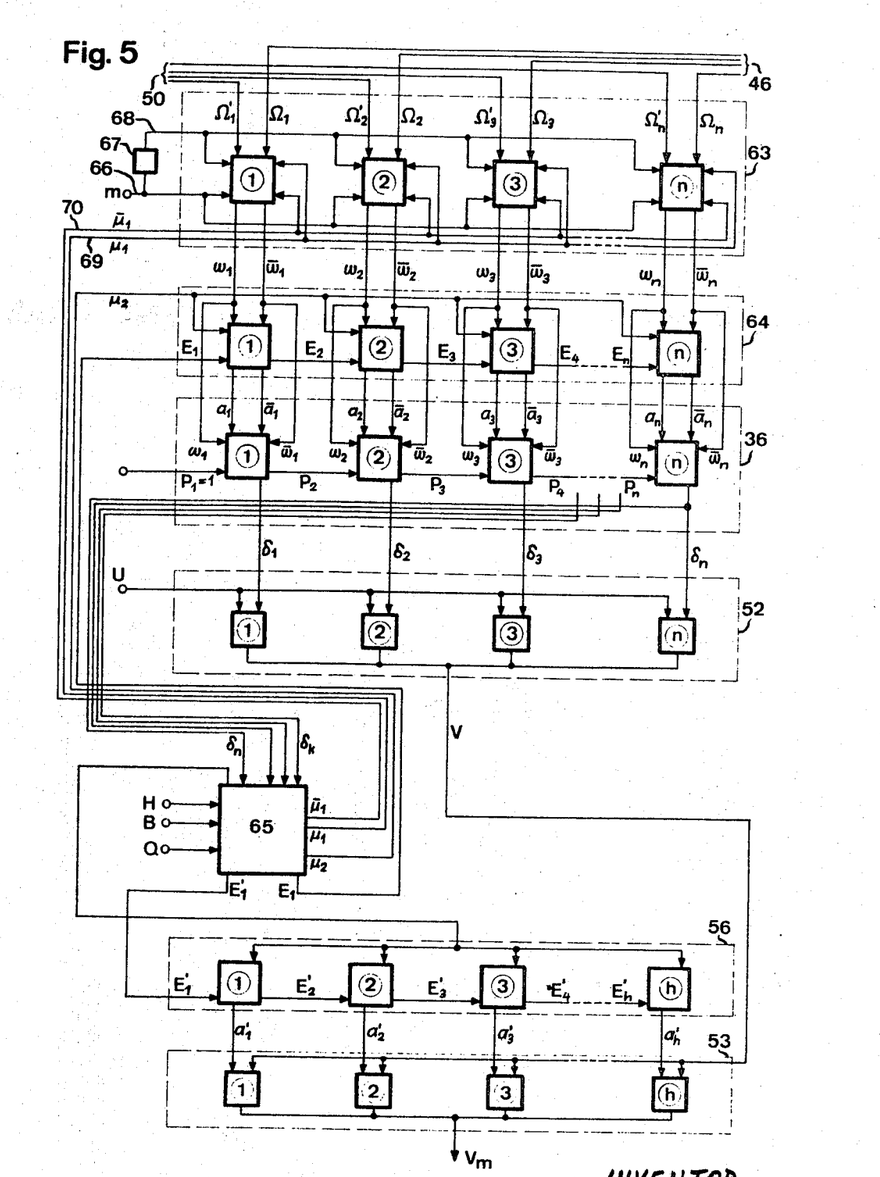
FIG. 5 is a more detailed schematic diagram of part of the apparatus.

FIG. 5 shows, in greater detail, the following circuits of the apparatus which will now be described: the inverters 47 and 51 grouped in a reversing switch 63; the principal counter 55 grouped with the gate 61 and a means 64; the end of travel path counter 56; the control means 58 grouped with the vernier arrangement 57, the gate 59 and the gate 60 in a control means 65; the subtractor 36; the principal decoder 52; and the end of travel path decoder 53.

The reversing switch 63, which encompasses inverters 47 and 51 represented individually in FIG. 4, is affected by both the signals $\Omega$ and the signals $\Omega'$. As these signals constitute a representation, in binary code, of signals $S_j$, respectively, $N_1$, they are always two in number, namely a series of $n$ signals $\Omega_k$ or a series of $n$ signals $\Omega'_k$, respectively, each corresponding to a binary digit. This is why the reversing switch 63 comprises an assembly of $n$ stages, each being referred to a level $1, 2 \ldots n$ of the binary digit to which it is delivered. Each of these stages is connected to a corresponding line in the cable 46 or 50 carrying the signals $\Omega_k$ and $\Omega'_k$, respectively, exiting from the respective matrices 45 and 49 of FIG. 4. Each of these provides two signals $\omega_k$ and $\omega'_k$ which are logical complements of each other. In addition, each stage receives, from the line 66, the signal $m$ delivered from the direction sensor DM (FIG. 4) and its complementary logic signal $\overline{m}$, which is delivered to the respective inverters 67 over the lines 68. Finally, each stage receives, through the lines 69 or 70, respectively, the signal $\mu_1$ or its logical complement $\mu'_1$, two being always delivered by the control device 65, and each stage acts in a manner such that $\omega_k$ is equal to $\Omega_k$ when $\mu_1=0$ and is equal to $\Omega'_k$ when $\mu_1=1$.

Figures 6, 7:
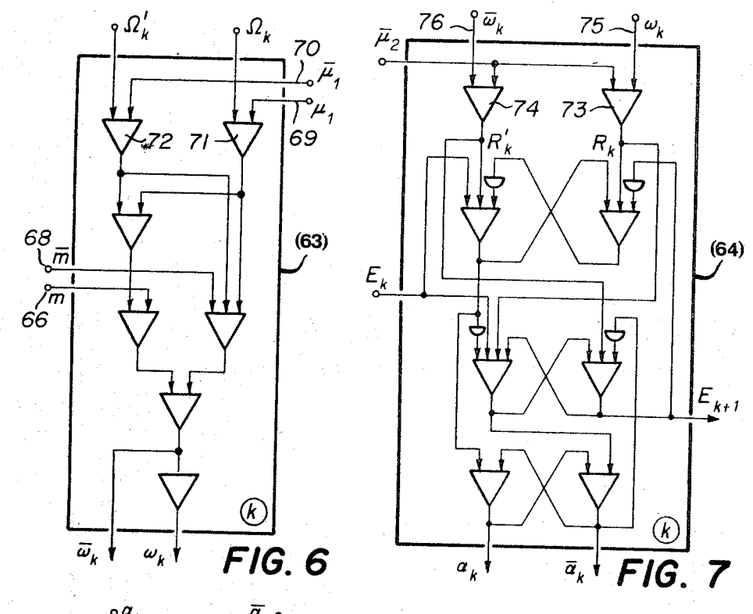
FIGS. 6 through 12 are detailed schematic diagrams of certain circuits appearing in FIG. 5.

A stage or reversing switch 63 is shown in FIG. 6, which illustrates the interconnections of the seven NOR elements, represented by triangles, of which the stage is constituted. The NOR elements 71 and 72 constitute the "switch" of the reversing switch (FIG. 5). All the stages are constructed in the same manner as shown in FIG. 6.

As shown in FIG. 7, the principal counter 64 also has $n$ identical stages, each one of which has its input connected to the output of the preceeding stage by a line indicated by the symbol of the signal $E_k$ which is transmitted therealong. The first stage receives, at its input $E_1$, pulses $Q_8$ issued in the same manner as the pulses $Q$, after division by 8 in the control means 65. The signals $\omega'_k$ and $\overline{\omega}_k$ which, when $\mu_1=0$, are substituted by the reversing switch with the signals $\omega_k$ and $\overline{\omega'_k}$, respectively, are utilized for resetting the stage $k$ of the counter at the moment when the signal $\overline{\mu}_2$ is null, that is, to say at the moment when $\mu_2=1$. Each stage delivers the pair of signals $\propto_k$ and $\overline{\propto}_k$, which are logical complements of each other and which are directed to the subtractor 36.

FIG. 7 illustrates the layout of a stage of the rank $k$ of the principal counter 64. This includes only the NOR elements, represented by the triangles, and the delay elements represented by the semi-circles. The first two NOR elements 73 and 74 are gates which initiate, when $\overline{\mu}_2=0$, resetting of the stage by recharging the latter with the signal $\overline{\omega'}_k$ or with $\omega'_k$, applied to the inputs 75 or the inputs 76, respectively. Each two elements 73 and 74 constitute the gate 61 of FIG. 4. With reference to FIG. 6, it can be seen then when $m=1$ (cabin ascending), the resetting is effected with $\omega'_k$ and, when $m=0$ (cabin descending), the resetting is effected with $\overline{\omega'}_k$, the logic complement of $\omega'_k$.

Figure 8:
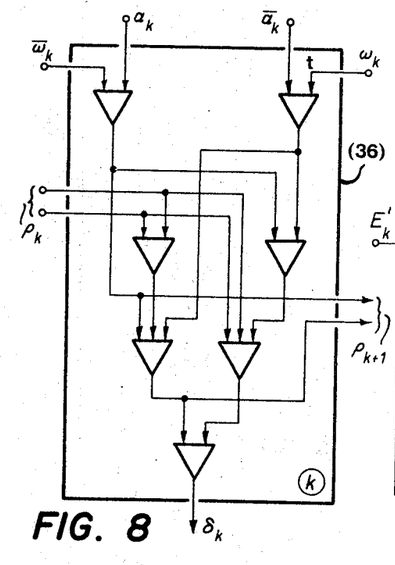

Subtractor 36 also comprises $n$ stages each of which receives the pairs of signals $\omega_k$, $\overline{\omega}_k$ and $\propto_k$ and $\overline{\propto}_k$, and which work in parallel. The stage of rank $k$ is connected to the preceding stage by the lines designated by the symbols $p_k$ which signals are carried by these lines and are the holding signals. Each stage delivers a signal $\delta_k$, which represents a digit of a number expressing the absolute value of the difference $\omega-\propto$. As can be seen in FIG. 8, each stage of the rank $k$ of the subtractor comprises only NOR elements. The first stage, of the rank $k=1$, receives a signal $p_1$ which is a permanent logical "1."

Principal decoder 52 of the function generator has the role of transforming the binary code signal $\delta$ into an analog signal $v$ constituting an approximation of the curve $V_m(z)$ shown in FIG. 1. The principal decoder is constituted by the pairs of resistances $R_k$ and $R'_k$, are conshown in FIG. 9. The midpoints of each of the stages, constitued by the pairs of resistances $R_k$ and $R'_k$, are connected to ground by the relay 77 when the signal $\delta_k$, representing the corresponding digits, have a value equal to 0. The resistances $R_1 \ldots R_k \ldots R_n$, on the one hand, and the resistances $R'_1 \ldots R'_k \ldots R'_n$, on the other hand, have values which increase as a function of their rank $k$ in accordance with a geometric progression having the ratio 2. In addition, the values $R_k$ and $R'_k$ of the resistances of each pair are in the relation $$R_k/R'_k = 4/1$$

Figure 9:
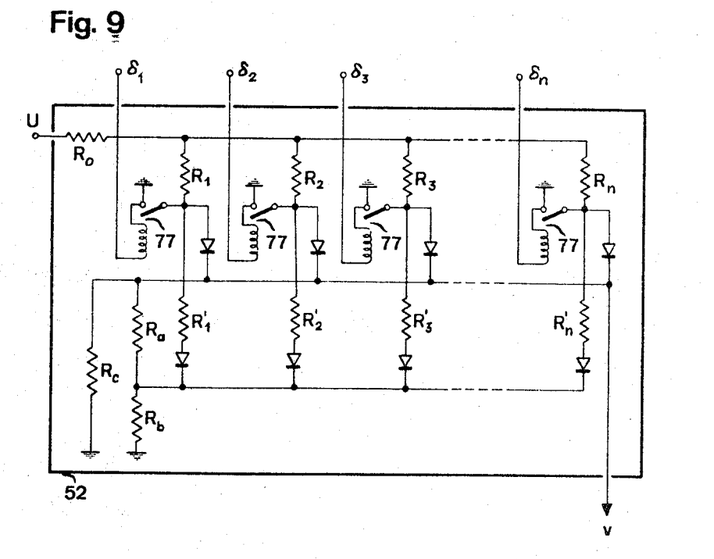

The assembly is fed across the input resistance $R_0$ by a continuing voltage U which, with the sense chosen for the connection of the diodes, must be positive. The output voltage $v$ is then positive. If it is desired, for a particular reason, to produce a negative output voltage $v$, it is necessary to invert the sense of connections of the diodes and to feed the assembly with a negative voltage U. The choice of the values of $R_0$, $R_a$, $R_b$ and $R_c$ defines the curve according to which the analog signal, which constitutes the continuous voltage $v$, varies as a function of the value $\delta$ expressed in binary code, and it is these values which determine the form of the curve of deceleration represented by the output signal $v$.

Figure 10:
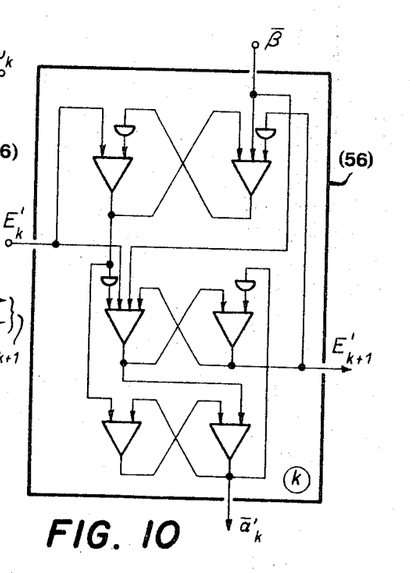

The end of travel path counter 56 comprises stages which, as shown in FIG. 10, differ from those of principal counter 55 only on two points. The first difference resides in that the gates 73 and 74 of FIG. 7, designed for resetting, are omitted, the signal $R_k$ being replaced by a signal $\overline{\beta}$ common to all the stages and generated, as will be seen further on, by the control means 65 for the counters. The second difference resides in that only the outputs $\overline{\propto}'_k$ are utilized. The fact of overlapping, for resetting the counter 56, has the same signal for all of the stages signifies that the counter is reset each time at the same initial value. It will be seen further on that the signals $E'_k$ counted by the counter are generated only at the moment or only when the digits of the inferior range of step $\delta_1 \ldots \delta_5$ differ by 0, so that the counter is effective only at the end of the path of travel.

Figure 11:
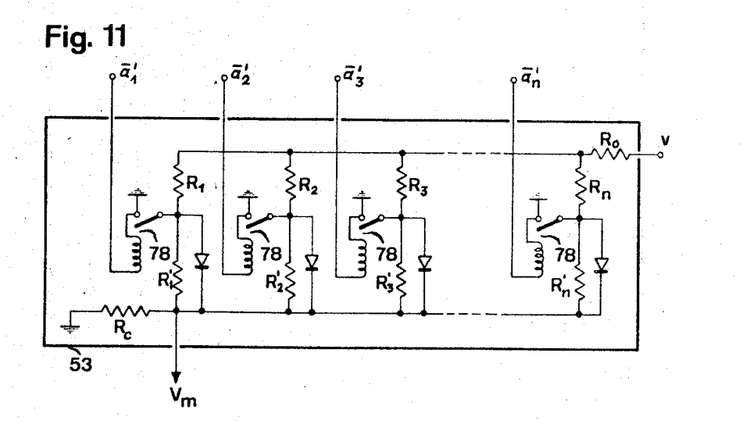

The end of path of travel decoder 553 is constituted by an assembly of resistances and diodes as shown in FIG. 11. The resistances $R_k$ and $R'_k$ have values which increase in geometrical progression by the ratio of 2 and which, for each pair constituting a stage, in the relation which, for each pair constituting a stage, in the relation $R'_k$ are connected to ground by the relay 77 when the signal $\overline{\propto}'_k$ representing the corresponding digit has the value 0, which is when the signal $\propto'_k=1$. The choice of the resistances $R_0$ and $R_c$ defines the curve according to which the analog signal, constituting the continuous voltage $V_m$, varies as a function of the value of $\overline{\propto}'_k$ expressed in binary code, and it is these values which determine the form of the end of the deceleration curve which constitutes the end of the course of travel output signal $V_m$.

The principal decorder 52 is connected in series with the end of path of travel decoder 53, which means that the voltage $v$ at the output of the former will be the feeding voltage for the output of the latter. The result is that, when all of the signals $\overline{\propto}'_k$ are qual to unity, which corresponds to the state of repose of counter 56, the signal $V_m$ from the output of the end of path of travel decorder 53 is proportional to the signal $v$ from the principal decoder 52. It is only when the end of path of travel counter is substituted for the principal counter that the decoder 53 provides, to the signal $V_m$, a variation constituting a fine approximation of the terminal part of the deceleration curve. It is convenient to note that the sense of the diodes, such appears in FIG. 11, is that which corresponds to a positive feeding voltage. If the feeding voltage is to be negative, it is necessary to invert this sense of connection.

Being given that the instantaneous relative distance $z_j$ of the cabin is always less than the greatest distance between two consecutive floors, augmented by the length of the path of slackening relative to the operating speed, the numerical means or organs have only to treat a number of digits superior to those which are necessary to express this distance in binary code. The number of stages of the matrices, of the reversing switch, of the principal counter, of the subtractor and of the principal decoder have thus a limited value, which is determined by the greatest inter-floor distance and by the operating speed of the cabin, and this value is independent of the height of the shaft in which the cabin operates.

Figure 12:
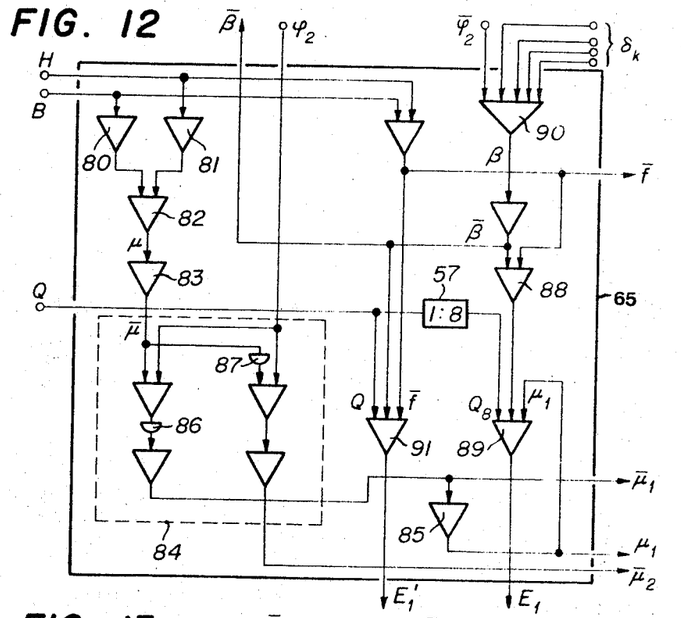

The control means 62 for the counters is shown schematically in FIG. 12. This is an assembly of NOR elements, shown as triangles, and of delay elements, shown as semi-circles. This assembly has multiple functions. Primarily, it generates the signals $\mu_1$, $\bar{\mu}_1$ and $\mu_2$ corresponding to the signals H and B from the proximity detectors. For this purpose, the NOR elements 80, 81 and 82 generate $\mu = \overline{H \wedge B}$ of which the element 83 derives the complement $\bar{\mu}$. From the signal $\bar{\mu}$, the elements grouped in the assembly 84 form the signals $\bar{\mu}_1$ and $\bar{\mu}_2$, the element 85 deriving the complement $\mu_1$ of the former.

This assembly 84 contains the delay elements 86 and 87, whose respective delay times are such that the appearance of $\mu_2$ is retarded relative to that of $\mu$, and that the disappearance of $\mu_1$ is retarded relative to that of $\mu$. The NOR elements 88 and 89 are an assembly constituting gate 60 of FIG. 4, which is controlled by the signals $\mu_1$, $\bar{f} = \overline{H \wedge B}$, and $\bar{\beta}$. This gate thus passes pulses $Q_8$ generated from the pulses $Q$ by the vernier arrangement or divider 57, except in the two following circumstances:

In the first part as soon as the cabin is within the recovery zone $\mu'$ of a pair of proximity detectors H′, B′, this gate blocks. The impulses $Q_8$ can no longer pass, which permits the resetting of the principal counter 55 of FIG. 4 (64 of FIG. 5).

On the other hand, from the time when the cabin is at the end of its path of travel, or when all of the digits $\delta_k$ of a superior order are 0 or null, the NOR element 90 generates a signal $\beta = 1$, which is to say that $\bar{\beta} = 0$. Under these conditions, NOR element 89 which, with NOR element 88, constitutes the gate 60 of FIG. 4, lets pass the pulses $Q_8$ such that $\bar{f} = 1$, which means that the cabin is outside or beyond the detectors H′ and B′ ($f = 0$). However, from the time when $\bar{f} = 0$, which is when the cabin reaches one or the other of the detectors H′ or B′, element 89 blocks the pulses $Q_8$, which immobilizes the principal counter. A the same time, and under the effect of the same signal $\bar{f} = 0$ and $\bar{\beta} = 0$, the NOR element 91 which constitutes the gate 59 of FIG. 4, lets pass the pulses Q, so that the end of path of travel counter is brought into action.

Figure 13:
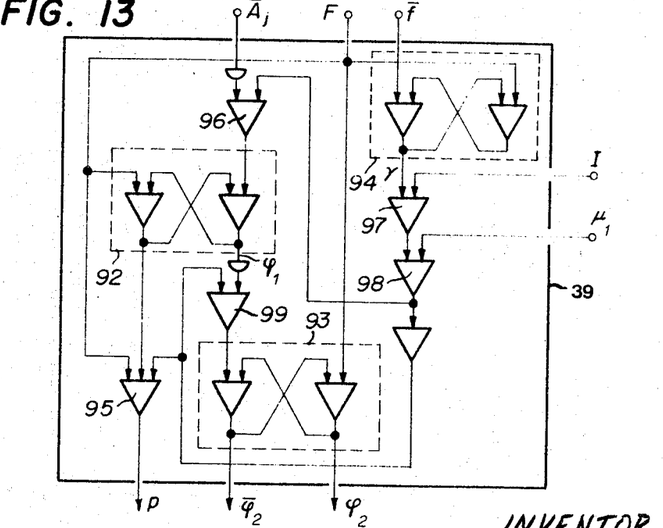
FIG. 13 is a schematic detail of a part of the apparatus shown in FIG. 4.

The call controller, which is shown in FIG. 13, comprises three memories 92, 93 and 94, each constituted by a pair of NOR elements, and five electronic gates 95, 96, 97, 98 and 99. Gate 95 derives the signal $p$ triggering the advance of the floor selector SE of FIG. 4. This signal appears if, at the moment when the signal I derived by the comparator 38 of FIG. 4 arrives, the signal $A_j$ has a value "0," which translates as the absence of a call for the floor $j$. In effect, the memory 92 has, when the cabin is stationary, a tilt into the state corresponding to $\phi_1 = 1$ under the effect of the signal $F = 1$ which expresses the closure of the brake of the servomotor SM of FIG. 3. From this, the signal $p$ steps the stage selector SE into the position $j+1$, the abrupt increase of $V_m$, which then results, triggering the disappearance of I. On the contrary, if there appears $A_j = 1$, representing the presence of a call, the memory 92 tilts into the state corresponding to $\phi_1 = 0$ and, at the moment where there appears $I = 1$, the gate 95 is blocked. $p$ conserves the value 0 and the floor selector SE stays in its position $j$ corresponding to the called floor. It is then that memory 93 tilts into the state corresponding to $\phi_2 = 1$, which triggers, in programmer PR, the substitution of $V_n$ to the previous order signal. The stopping of the cabin is indicated by the appearance of the signal $F = 1$ (brake tightened), which returns the memories 92 and 93 into the positions corresponding, respectively, to $\phi_1 = 1$ and $\phi_2 = 0$. Memory 94 tilts, under the effect of signal $F = 1$, into the state corresponding to $\gamma = 1$, which produces, at the moment of departure of the cabin, a pulse capable of triggering, in place and in the place of I, an impulse $p = 1$ in such a way that the floor selector is set for the floor following the departure floor. The signal $\gamma$ is transmitted by gate 98 only when $\mu_1 = 0$, indicating that the cabin is really in movement, and disappears simultaneously with $\bar{f} = 1$, indicating that the cabin has cleared the proximity marks H′ or B′.

The apparatus which has been described in detail is not limited to the logic elements of the NOR type, and to delay elements. It will be evident that the apparatus could be constructed using electricomechanical elements such as relays, but the use of static logic elements (for example, magnetic elements, or transistors, or integral elements, etc.) presents very great advantages from the point of view of security of functioning. With such elements, in effect, there is no fear of fatigue of contacts nor of wear of movable parts, which reduces the need of maintenance materials.

With respect to the floor marks or detectors, it has been assumed that these will act in the nature of magnetic elements. It will be evident, however, that these elements can be of another type, for example, they can take the form of contactors mounted on the cabin and activated by guide rails fixed in the shaft. Photoelectric detectors may also be positioned along the shaft to act as floor indicators or detectors.

Finally, the generation of the pulses Q, which it has been assumed would be effected by the perforated disks DP and the reader L, can be effected in other manners. This generator can be, for example, a detector which is fixed in the cabin and which reads a fixed perforated band disposed within the shaft, or any other apparatus capable of providing successive impulses in a rapid cadence as a function of the movement of the cabin. By a rapid cadence, it should be understood a cadence of the order of 1,000 impulses per second at least, a figure which corresponds to a pulse of 6 mm. of travel of the cabin, with the latter being moved at a speed of 6 mm. per second.

Figure 14:
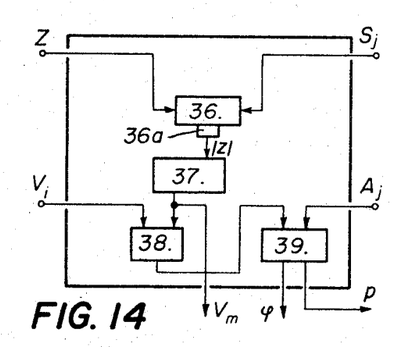
FIGS. 14 through 19 are schematic functional representations of various modifications, with FIG. 19 repeating, for purposes of comparison, the principal elements of FIG. 4.
Figure 15:
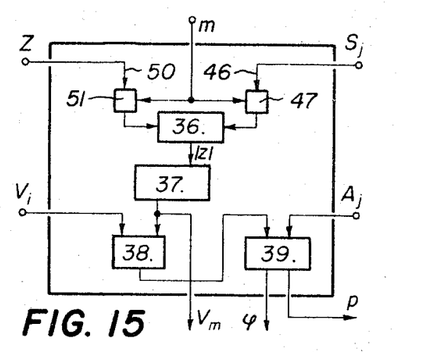

On the other hand, the form of realization which has been described in detail constitutes an apparatus in which the subtractor is a means of a numerical-type, in the particular instance of a type numerical-binary. It will be apparent that the subtractor could be an analog type, and such apparatus is shown in FIGS. 14 and 15. In this case, the call signal and the absolute position signal must be of an analog-type, which translates the symbols $S_j$, $Z_j$ (deprived of asterisk) designating the inputs of the apparatus. Subtractor 36 must, in this case, also be capable of delivering a signal $|z|$ representing the absolute value of the difference $S_j - Z$, which is particularly evidenced in FIG. 14 by the element 36a having the function of deriving this absolute value. When the elevator is provided with a direction sensor, resorting to this element 36a can be avoided by inserting, in lines 46 and 50, as shown in FIG. 15, inverters 47 and 51 which are controlled by the signal $m$ provided from the direction detector. These inverters act in a manner to transmit, without change, the signals $S_j$ and Z when $m=1$ (ascending movement) and, when $m=0$ (descending movement), to transmit the opposite signals ($-S_j$ and $-Z$). Under these conditions, the subtractor 36 always derives the absolute value $|z|$ of the difference $S_j-Z$.

Figure 16:
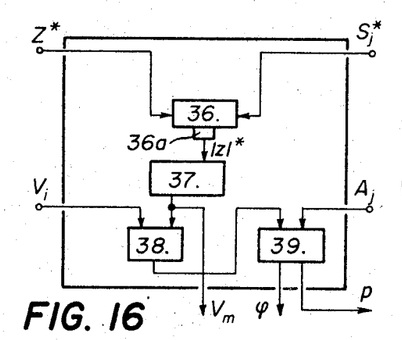
Figure 17:
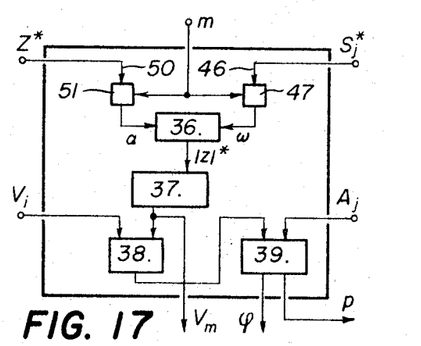

If the elevator is equipped with a position detector capable of delivering a position signal under the numerical form $Z^*$ and with a call selector capable of delivering the call signals under the numerical form $S^*_j$, the apparatus can include a subtractor 36 which is of a numerical-type. As shown in FIG. 16, such numerical subtractor comprises an element 36a acting in such a manner that the numerical signal $Z^*$, which is delivered, is equal to the absolute value of $S^*_j-Z^*$. As shown in FIG. 17 the apparatus may comprise inverters 47 and 51 which, are, in fact, complementary circuits, controlled by the signal $m$ provided from a direction detector and acting in a manner to transmit to the subtractor signals $S^*_j$ and $Z^*$, or their complements $\overline{S}^*_j$ and $\overline{Z}^*$ according to whether the cabin is ascending ($m=1$) or descending ($m=0$).

As a position detector capable of delivering a numerical position signal, there may be cited, for example, a multiple track disk DP, with each track read by a reader L, these tracks having perforations disposed in a manner such that the signals from the readers or detectors L constitute a numerical representation of the angular position of the disk. Resort may also be had to a multiple track tape extending the length of the shaft, the tracks being read by an assembly of readers or detectors fixed in the cabin, the assembly acting in a manner such that the series of signals from the detectors or readers constitute a numerical representation of the position of the cabin.

Figure 18:
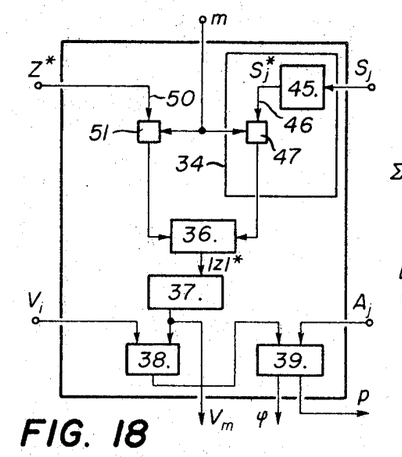

FIG. 18 represents the case where the position detector delivers a position signal of a numerical type $Z^*$, while the signal $S_j$ provided from the floor selector is of an analog-type. The apparatus then includes an analog-numerical convertor 45 which, should the case arise, can be grouped with the inverter 47 in the numerical coder 34 connected to the corresponding input of the subtractor 36. Finally, FIG. 19, which is presented only to complete the recapitulation of the possible variations, represents the principal elements of the embodiments which have been described in detail above.

Figure 19:
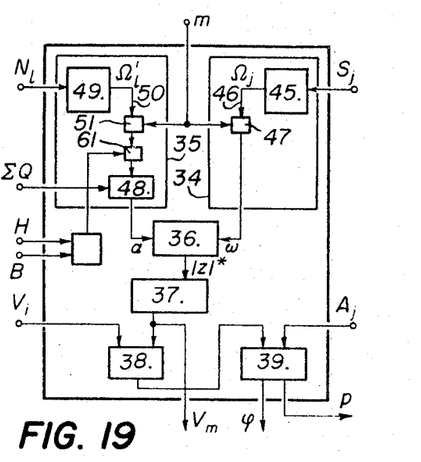

All the variations have, in common, the following means: Subtractor 36, function generator 37, comparator 38 and control circuit 39. Comparator 38 and control circuit 39 are always of an analog-type, while the subtractor, as has been shown, can be either an analog-type or a numerical-type. In the first case, the function generator 37 will also be an analog-type, of a nature such that the entire apparatus will be of an analog-type (FIGS. 14 and 15). In the second case, the function generator will be of a hybrid-type, namely, a numerical-analog-type, of a sort such that the apparatus will then be of a hybrid-type (FIGS. 16 and 17). In the case of FIG. 19, which corresponds to the embodiment described in detail above, the numerical part of the hybrid apparatus is of a binary-type.

The invention apparatus, which can be easily substituted for traditional controls without its installation necessitating great modifications, presents, by comparison, essential advantages. Being given that, in the case where the call distance is less than the sum of the acceleration path and the braking path, the cabin accelerates the longest time possible before commencing its deceleration and when, in the case where the distance of the call is greater than this sum, the cabin attains always its full operating speed, the elevator executing each operation in a minimum of time. In addition, it can at the same time honor calls arriving "the last possible moment," which means that it can honor all late calls which appear before the cabin attains the starting point of the corresponding deceleration characteristic.

What is claimed is:

1. Method of controlling a high speed elevator, of the type including a cabin displaced along an elevator shaft, intersecting plural floors, by a hoist controlled as to speed by a servoregulator, with the cabin movement including an acceleration phase, a constant high speed phase and a deceleration phase, said method comprising the steps of establishing a preselected deceleration characteristic for the deceleration phase, determining as a function of the path of cabin travel, the speed decrease to the destination floor; providing a first continuous signal corresponding to the instantaneous speed of the cabin; providing a second continuous signal corresponding to the instantaneous position of the cabin; generating a floor signal representing the absolute position of the nearest floor at which the cabin can be stopped in accordance with said deceleration characteristic; continually deriving a cabin relative position signal as the absolute value of the difference between said second signal and said floor signal; independently of said relative position signal, generating a deceleration signal conforming to said deceleration characteristic and representing, at each instant, the maximum speed which said cabin cannot exceed and still be stopped at the nearest floor; continuously comparing said first signal with said deceleration signal; if, at the moment when said first signal and said deceleration signal are equal, there is present a call for the nearest floor, utilizing said deceleration signal to decelerate the cabin in accordance with said deceleration characteristic, and if, at said moment, there is no call for the nearest floor, initiating generation of a floor signal representing the absolute position of the following floor in the direction of cabin movement; and repeating the aforementioned operations in approaching said following floor as the new nearest floor.

2. Method of controlling a high speed elevator as claimed in claim 1, including the step of providing said first continuous signal, corresponding to the instantaneous speed of the cabin, in analog form; providing said second continuous signal, corresponding to the instantaneous position of the cabin, and said floor signal, in numerical form to obtain said cabin relative position signal in numerical form; and generating said deceleration signal in analog form to provide for direct comparison thereof with said first continuous signal corresponding to the instantaneous speed of the cabin.

3. Apparatus for controlling a high speed elevator, of the type including a cabin displaced along an elevator shaft, intersecting plural floors, by a hoist controlled as to speed by a servoregulator, the cabin movement including an acceleration phase, a constant high speed phase and a deceleration phase, with the deceleration phase having a deceleration characteristic determining, as a function of the path of cabin travel, the speed decrease to the destination floor, the elevator further including a call memory, a floor selector providing a floor signal representing an approaching floor which the cabin can service, a call detector providing a call signal when there is a coincidence between the number of the called floor and the number of the approaching floor which can be serviced, a position detector delivering a signal representing the absolute position of the cabin in its shaft, and a tachometer providing a signal representing the instantaneous speed of the cabin: said apparatus comprising, in combination, a subtractor having a first input connected to said position detector and a second input connected to said floor selector, said subtractor providing, at its output a signal equal to the absolute value of the difference between said absolute position signal and said floor signal and representing the relative position of said cabin with respect to the floor corresponding to the floor signalled; a function generator connected to the output of said subtractor and delivering a deceleration signal varying as a function of the relative position signal in accordance with said deceleration characteristic; a comparator having a first input connected to the output of said function generator and a second input connected to said tachometer, and delivering a control signal whenever the deceleration signal is equal to the instantaneous speed signal; a programmer delivering a speed control signal to said servoregulator; and a control circuit having a first input connected to said comparator and a second input connected to said floor selector, and an output connected to an input of said programmer; said control circuit being activated responsive to said control signal; said control circuit, when activated, and responsive to an absence in said call memory of calls for floors in advance of the initially called floor, to deliver an advancing signal effective to advance said floor selector only in a direction corresponding to the direction in which said cabin is moving and, responsive to the presence in the call memory of a call for a floor in advance of said initially called floor, to deliver an acceleration initiation signal to said programmer operable to activate said programmer to substitute said deceleration signal for the signal previously delivered by said programmer; whereby, in the first case, the cabin will continue its movement in accordance with the program imposed by said programmer and, in the second case, the cabin will be decelerated in accordance with said deceleration characteristic, in a manner such that said control apparatus provides for the elevator to honor all calls for a floor when such calls arrive before the instant of the initiation of deceleration corresponding to the respective floor.

4. Apparatus for controlling a high speed elevator, as claimed in claim 3, in which said function generator delivers said deceleration signal in analog form; the signals delivered by said comparator and said control circuit being likewise in analog form.

5. Apparatus for controlling a high speed elevator, as claimed in claim 4, in which said signal representing the absolute position of the cabin in its shaft and said floor signals are in analog form; said subtractor and said function generator being an analog-type subtractor and an analog-type function generator, respectively; whereby said apparatus is entirely an analog-type apparatus.

6. Apparatus for controlling a high speed elevator, as claimed in claim 4, in which said position detector delivers the signal representing the absolute position of the cabin in its shaft in numerical form; said floor selector providing a floor signal in analog form; an analog-numerical converter operable to transform said floor signal into a numerical floor signal; said subtractor being a numerical-type subtractor; said function generator being a hybrid numerical-analog-type subtractor; whereby said apparatus is of a hybrid numerical-analog-type.

7. Apparatus for controlling a high speed elevator, as claimed in claim 6, in which said position detector delivers a numerical signal of the absolute position of said cabin in its shaft and in the form of a series of pulses with each pulse corresponding to an elementary displacement of said cabin in its shaft; a binary counting circuit connected to the output of said position detector and counting said pulses, said binary counting circuit delivering a binary signal, representing the counting result, and constituting the numerical absolute position signal applied to the first input of said subtractor.

8. Apparatus for controlling a high speed elevator, as claimed in claim 7, in which said elevator includes respective pairs of floor detectors for each floor, one of each pair being located above the respective floor and the other below the respective floor, and said floor detectors delivering floor approach and floor leaving signals in accordance with the direction of movement of said cabin in its shaft with respect to the respective floor; a matrix of binary coders connected to said floor detectors and transforming the floor approach and floor leaving signals into binary signals; said counting circuit including counter means counting said pulses and further including a reset circuit resetting said counter means with the binary signal from said matrix of binary coders each time said cabin passes a floor.

9. Apparatus for controlling a high speed elevator, as claimed in claim 8, in which the floor detectors of each pair provide respective signals whose simultaneous existence establishes that the cabin is exactly at the level of the respective floor; the signals provided by each pair of floor detectors overlapping for a short distance upwardly and downwardly of the respective floor; a coincidence circuit connected to said floor detectors and passing the floor approach signal when said floor approach and floor leaving signals are simultaneously present, said coincidence circuit interrupting passage of said floor approach signal except when said floor approach signal and said floor leaving signal are simultaneously present; said coincidence circuit effecting resetting of said counter means with precision.

10. Apparatus for controlling a high speed elevator, as claimed in claim 8, in which said counting circuit comprises first and second binary counters connected to said position circuit; a vernier arrangement interposed between said first binary counter and said position detector and reducing the number of said pulses, corresponding to an elementary displacement of said cabin, supplied to said first binary counter by a preselected factor, said first binary counter delivering a first binary signal; said second binary counter receiving said pulses, corresponding to an elementary displacement of said cabin, in by-pass relation with said vernier arrangement and providing a binary signal representing the total number of said pulses counted; said hybrid function generator comprising first and second binary decoders connected in series; said first binary decoder having an input connected to the output of said binary subtractor to receive said relative position binary signal therefrom; said second binary decoder being connected to said second binary counter to receive said second binary signal therefrom; said function generator supplying said deceleration signal to said binary decoder; and means operable to maintain said second binary counter inactive while said relative position binary signal exceeds a predetermined value, and to activate said second binary counter when said relative position binary signal is less than said predetermined value.

11. Apparatus for controlling a high speed elevator, as claimed in claim 5, in which said elevator includes a direction of cabin movement detector; first and second inverters, said first inverter being connected in a line leading from the output of said position detector and said second inverter being connected in a line leading from the output of said floor selector; said direction of cabin movement detector being connected to both said inverters and controlling the latter in a manner such that, when said cabin is ascending, said subtractor receives an absolute position signal and said floor signal and, when said cabin is descending, said subtractor receives the opposites of said absolute position signal and said floor signal, whereby the signal delivered by said subtractor is always equal to the absolute value of the difference between the signals received thereby.

12. Apparatus for controlling a high speed elevator, as claimed in claim 10, in which said elevator includes a direction of cabin movement indicator; first and second complementary circuits, the first complementary circuit being interposed in the line feeding the numerical absolute position signal and the numerical floor approach signal; the second complementary circuit being connected in the line feeding the numerical floor signal; said complementary circuits transmitting the numerical signals without change, when said cabin is ascending, and transmitting the complements of these numerical signals, when the cabin is descending, whereby the signal delivered by said numerical subtractor is always equal to the absolute value of the difference between the signals delivered thereto.

13. Apparatus for controlling a high speed elevator, as claimed in claim 12, in which said complementary circuits are interposed between the output of said matrix of binary coders and the input of said resetting circuit of said first counter; said first counter having a single direction of counting independent of the direction of movement of said cabin.

14. Apparatus for controlling a high speed elevator, as claimed in claim 13, in which said first binary counter has a number of stages equal to the number necessary to count the reduced number of said pulses received thereby and corresponding to the travel of the cabin equal to the greatest distance between two consecutive floors served by said elevator, increased by the length of the deceleration travel with respect to the running speed.

References Cited
UNITED STATES PATENTS 3,277,355  10/1966  Troutman et al. _______ 318—28
3,350,612  10/1967  Hansen et al. ________ 318—143

BENJAMIN DOBECK, Primary Examiner

W. E. DUNCANSON, Jr., Assistant Examiner